United States Patent Office 3,090,005
Patented May 14, 1963

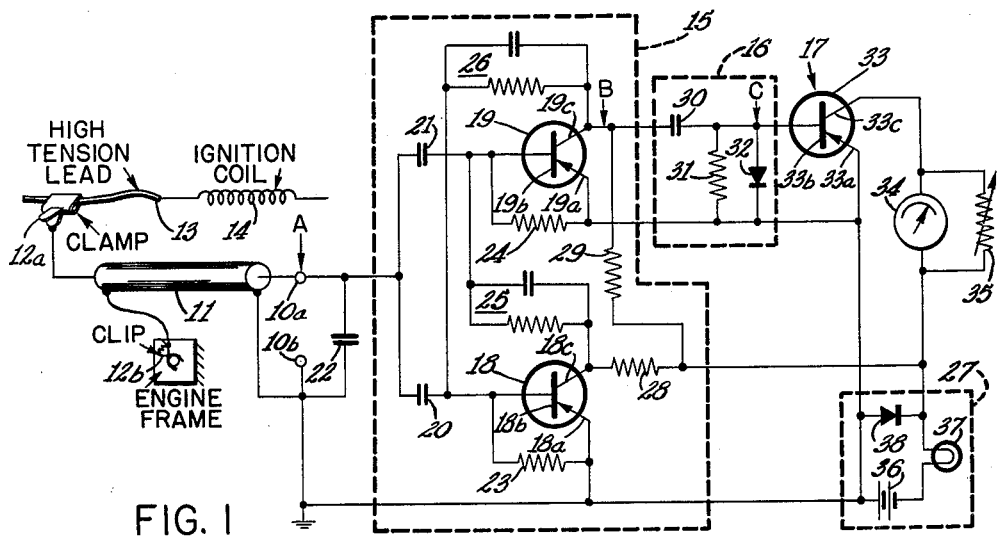
May 14, 1963 — J. L. McCONNELL — 3,090,005
ELECTRONIC PULSE REPETITION RATE INDICATOR
Filed Sept. 1, 1959
INVENTOR
JAMES L. McCONNELL

3,090,005
ELECTRONIC PULSE REPETITION RATE
INDICATOR
James L. McConnell, Stevensville, Mich., assignor, by mesne assignments, to Daystrom, Incorporated, Murray Hill, N.J., a corporation of Texas
Filed Sept. 1, 1959, Ser. No. 837,457
6 Claims. (Cl. 324—70)

This invention relates to indicating apparatus and more particularly to electrical apparatus for indicating a non-electrical quantity.

There are many instances when it is necessary or desirable to have an indication of the rate of travel of a moving body. One very common instance is the case of a rotating member such as, for example, the crankshaft of an internal combustion engine. The speed of such a rotating member is usually measured by a mechanical tachometer. Such tachometers are commonly coupled to the rotating member by a mechanical linkage arrangement of one sort or another. These arrangements, while satisfactory for some uses, are quite unsatisfactory for others, for a number of reasons.

Among these reasons is the fact that many of the mechanical linkage arrangements employed are somewhat of a permanent nature and, therefore, a tachometer used in such an arrangement is not easily adapted for use with different machines or engines having various shapes and designs. Interchangeability and versatility with such an arrangement is therefore limited. Still other mechanical arrangements have the further disadvantages of requiring some sort of periodic lubrication, and being subject to wear, breakdown, and consequent repair.

Accordingly, it is an object of this invention to obviate the above disadvantages by providing an electronic indicator for indicating the rate of travel of a moving member, which does not involve the use of a mechanical linkage, or special design of the moving member or mechanism with which the indicator is to be used in order that the indicator function satisfactorily.

It is another object to provide an electronic tachometer for indicating the number of revolutions per minute of a rotating member.

An important feature of this invention is that the speed of an internal combustion engine having a spark ignition system may be obtained simply by clipping a pair of input leads from the tachometer to the electrical system of the engine.

One of the advantages of this invention is that it can be utilized to indicate the number of revolutions per minute of virtually various rotating members merely by providing a simple pulse producing make-break electrical mechanism to be actuated by the rotating member.

Another advantage lies in the adaptability and versatility of an electronic tachometer in that it can be conveniently and easily employed with any internal combustion engine having a spark ignition system, without the use of any additional parts, or the modification of any part of the engine.

A still further advantage results from the fact that the indicating instrument constructed in accordance with this invention functions entirely in an electronic manner and thus is not subject to disadvantageous mechanical considerations such as mechanical wear, lubrication, etc.

Other objects, features, and advantages of my invention will become apparent from a reading of the specification taken in conjunction with the accompanying drawings, in which:

FIGURE 1 is a schematic wiring diagram of a unit constructed in accordance with the invention, FIGURE 2 shows a series of waveforms at various points in the wiring diagram of FIGURE 1, FIGURE 3 is a schematic wiring diagram of an arrangement for producing a train of pulses used for calibrating the unit shown in FIGURE 1, and FIGURE 4 shows a simple make-break electrical contact mechanism which makes possible the use of the unit shown in FIGURE 1 with a wide variety of rotating members of different types.

Briefly, the invention comprises a novel arrangement whereby a train of input trigger pulses having a frequency or rate of occurrence which is indicative of the rate of travel of a moving member is fed to a pulse translating circuit which modifies these pulses and feeds a series of output pulses thus produced to an appropriate indicating means.

The translating circuit includes means responsive to the trigger pulses for producing a signal waveform during at least a portion of half the time interval immediately following alternate trigger pulses, this signal waveform having either a steep leading or trailing edge, or both. The translating circuit also includes wave shaping means coupled to receive this signal waveform for producing a series of output pulses substantially at the time of occurrence of the signal waveform leading or trailing edges. These output pulses are fed to a sensitive current indicator which can be calibrated to indicate the rate of travel of the moving member and may be expressed, for example, in revolutions per minute for indicating the speed of a rotating member.

Referring now to FIGURE 1 there is shown a translating circuit embodying the principles of the invention. This circuit is provided with a pair of input terminals 10a, 10b, for receiving a train of input trigger pulses by means of a coaxial cable 11 having at one end a capacitive pickup device 12a which may be in the form of a spring clamp, and also a ground terminal clip 12b. The input pulses may be obtained, for example, from the high tension lead 13 connected to the ignition coil 14 of an internal combustion engine.

The translating circuit includes, but is not limited to, a bistable circuit in the form, for example, of a multivibrator 15, a wave shaping circuit 16, and also preferably an amplifier designated generally by the numeral 17.

The multivibrator 15 includes two transistors 18 and 19, each having respectively emitter electrodes 18a, 19a, base electrodes 18b, 19b, and collector electrodes 18c, 19c. Coupling capacitors 20 and 21 connect the ungrounded input terminal 10a respectively to the base input electrodes of the first transistor 18 and the second transistor 19. A capacitor 22 is also provided between the ungrounded terminal 10a and ground, for eliminating the ignition hash from the input.

Each of the transistors 18 and 19 has its emitter connected to ground potential. Base to emitter resistors 23 and 24 are provided between the base and emitter electrodes of the transistors 18 and 19 respectively. The collector of the transistor 18 is connected to the base of the transistor 19 through a parallel RC network 25; likewise the collector of the transistor 19 is connected to the base of the transistor 18 through a parallel RC network 26. A power supply 27 is also provided for impressing the proper emitter to collector potential on the transistors 18 and 19 through resistors 28 and 29 respectively.

The output of the multivibrator circuit is taken from the collector terminal 19c of the transistor 19 and is fed to the wave shaping circuit 16. This circuit comprises a differentiating network including a series connected capacitor 30 and a resistor 31, in combination with a clamping diode 32 bridging the resistor.

The output of the wave shaping circuit is applied between the emitter electrode 33a and base electrode 33b of a PNP amplifier transistor 33. The output from this amplifier is taken from the collector electrode 33c and is fed to a sensitive current indicator such as an ammeter 34, connected between the collector and the power supply 27. This ammeter is bridged by a variable resistor 35 for purposes of calibration as will later appear.

In view of the fact that the unit is inherently versatile in that it may be conveniently employed without any modification, to indicate the shaft speeds of various engines having spark ignition, the power supply 27 of the unit includes special provisions enabling it to be used with any of the usual battery potentials in common use with these engines without any changes whatever. Accordingly, the power supply includes a source of input voltage such as a battery 36 in series combination with a resistance component having a non-linear positive temperature coefficient of resistance such as a tungsten filament incandescent lamp 37. This series combination is bridged by a unidirectionally conductive device such as a selenium diode 38 connected so as to be biased in the direction of forward current flow.

This network produces as a result of the combined characteristics of the diode and the lamp an extremely inexpensive method of achieving good voltage regulation. The non-linear positive temperature coefficient characteristic of the lamp is used as a means of obtaining some degree of regulation of voltage over a wide range of battery input voltages. The shunt selenium diode connected in the forward biased direction functions to maintain the voltage drop across it within very close limits, for example, of the order of a tenth of a volt. This combination makes it possible for the unit described in FIGURE 1 to operate very satisfactorily with batteries 36 or other D.C. supplies of widely varying voltages. As an example, whether the voltage from the battery 36 is as low as approximately six volts or as high as approximately fifteen volts, the voltage change across the diode 38 is maintained within approximately 0.1 volt when a diode 38 having six plates with a 65 milliampere rating is used with two lamps 37 having a six to eight volt, 150 milliampere rating. The voltage regulating action, however, is not limited to this range, but may be extended on both the upper and lower ends by a proper choice of the resistance 37 and diode 38.

The circuit functions in the manner now to be described. The train of input trigger ignition pulses from the high tension lead 13 are coupled by the capacitive action of the clamp 12a and by the ground clip 12b to the input terminals 10a, 10b (point A), and from there to the multivibrator 15. The waveform of these input trigger pulses is shown at A in FIGURE 2. The multivibrator is so designed that the first trigger pulse shown at time $t_1$ in FIGURE 2 turns the multivibrator on thus putting it in a first stable state until time $t_2$ when a second trigger pulse turns it off thus putting it in a second stable state. As a result, the pulses on the multivibrator output electrode 19c (point B in FIGURE 1), appear as shown by the signal waveform at B in FIGURE 2. These pulses are square waves having leading edges at times $t_1$, $t_3$, etc., and trailing edges at times $t_2$, $t_4$, etc. The amplitude of the multivibrator square wave output is always constant but the frequency of these waves changes as the input pulse repetition rate changes.

The square wave output of the multivibrator is then fed into the wave shaping circuit 16. The differentiating portion of the wave shaping circuit, i.e. the capacitor 30 in combination with the resistor 31, functions to produce positive pulses at times $t_1$, $t_3$, etc., and negative pulses at times $t_2$, $t_4$, etc., as shown by the waveform C in FIGURE 2. The diode 32 functions as a clamping diode, eliminating the positive pulses of the waveform C; the series of negative pulses comprise the useful output signal and are used to drive the amplifier 17, which in turn actuates the ammeter 34. The diode 32 also holds the D.C. level of the signal which is applied to the amplifier 17 at zero when no negative pulses are applied to the amplifier. This zero voltage level serves as a D.C. reference level at the amplifier input.

When the engine speed is increased, the frequency of the input trigger pulses from the engine ignition system increases. As can be seen from FIGURE 2, this results in a proportionate increase in the frequency of the wave shaping circuit output pulses (waveform C) applied to the input of the amplifier 17. Consequently, the D.C. level at the amplifier input becomes more negative, thus increasing the amplifier collector current and raising the meter pointer. By similar reasoning, it will be appreciated that a reduction in engine speed results in a lower meter reading. The meter 34 can, of course, be calibrated to indicate the number of revolutions per minute of the engine with which it is associated and thus provide an indication of the engine shaft speed directly on the meter face.

To calibrate the meter, the adjustable meter shunt resistor 35 has been provided, so that the correct amount of current passes through the meter 34 to cause the meter to read a given number of revolutions per minute when used with a given type of engine.

In the absence of a known accurate speed indicator, the meter 34 can be easily calibrated with the aid of the circuit shown in FIGURE 3. This circuit includes a neon lamp 39 such as that known by the commercial designation "NE–2," in series with a current limiting resistor 40. These two components are connected preferably across a 110 volt A.C. line. Output terminals 41a, 41b are also provided across the resistor 40. The neon lamp has a characteristic such that at approximately 90 volts the internal resistance of the lamp changes abruptly from high to low, causing the lamp to fire or conduct. This causes the current flow in this circuit to increase rapidly thus developing a sharp pulse across the limiting resistor 40. This pulse is used to trigger the multivibrator as would a pulse from the ignition system of an internal combustion engine.

Simple formulae which can be used when calibrating with the circuit of FIGURE 3 are as follows: For a two cycle engine:

$$S = F\frac{60}{N} \text{ r.p.m.}$$

For a four cycle engine:

$$S = F\frac{120}{N}$$

where:

$F$=the A.C. line frequency in cycles per second,
$S$=the indicated speed in revolutions per minute, and
$N$=the number of engine cylinders.

Thus, for example, when using the circuit of FIGURE 3 to calibrate the meter 34, the calibration resistance 35 would be adjusted until the meter indicated 900 revolutions per minute for a two cycle engine, and 1800 revolutions per minute for a four cycle engine.

While the invention has been described with specific reference to the measurement of the number of revolutions per minute of the shaft of an internal combustion engine with a spark ignition system, it can also be employed to indicate the number of revolutions per minute of any rotating shaft simply by the addition of an arrangement such as that shown in FIGURE 4. This arrangement is provided in order that a train of input pulses be provided for connection to the input terminals 10a, 10b, which have a rate of occurrence proportional to the shaft rotational speed.

There is shown in FIGURE 4 a shaft 43 having a cam 44 affixed thereto by any convenient means such as, for example, a set screw 45. This cam has a raised portion 46 for actuating a movable spring loaded arm 47 and thus closing a pair of contacts 48, 48a, each time the shaft makes one revolution. The fixed contact 48 is mounted on an insulating block 49 and the movable contact is mounted on the spring arm 47. This spring arm is also mounted on an insulating block 50 and another insulating block 51 is provided on the arm so that there will be no electrical contact between the arm 47 and the cam 44.

The contacts 48, 48a, form part of a circuit which is supplied from, for example, a 110 volt A.C. source and includes in addition to the points, a resistor 52, the ends of which are provided with a pair of output terminals 53a, 53b.

When using this arrangement with the electronic tachometer of FIGURE 1, the input terminals 10a, 10b of the tachometer unit will be connected respectively to the terminals 53a, 53b instead of to the engine ignition system shown in FIGURE 1. As a result, each time the shaft 43 revolves a pulse will be produced at the terminals 53a, 53b for operating the multivibrator 15 of FIGURE 1. Since the rate of occurrence of the pulses produced at these terminals is proportional to the speed of the shaft 43, assuming meter 34 to be calibrated for the arrangement of FIGURE 4, the meter will indicate directly the various speeds of the shaft.

It will be appreciated that this invention can also be utilized for indicating rates of linear travel as well as other quantities and functions such as, for example, counting, merely by adapting the teachings above, particularly those of FIGURES 1 and 4, to the particular application.

It should be understood that since only the negative pulses at times $t_2$, $t_4$, etc., at C in FIGURE 2 are employed to drive the amplifier 17 that my invention will work equally well if the positive pulses at times $t_1$, $t_3$, etc., are not produced at all. Therefore, it is not essential that a square wave such as that shown at B in FIGURE 2 be produced, but that instead a device which would produce only sharp trailing edges, i.e., edges having a high rate of change characteristic, at times $t_2$, $t_4$, etc., could satisfactorily be employed. Additionally, it will also be clear that instead of eliminating the positive pulses shown at C in FIGURE 2, the negative pulses could be eliminated by reversing the diode 32, and the positive pulses could be utilized, by for example, the substitution of an NPN transistor for the PNP amplifier transistor 33.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a source of input trigger pulses, means responsive to said trigger pulses for producing a signal waveform during at least a portion of half the time interval immediately following alternate trigger pulses, said signal waveform including an edge having a high rate of change characteristic, wave shaping means responsive to said signal waveform for producing a series of output pulses in time relationship with said edges of said signal waveform, means coupling said first mentioned means to a source of regulated electric power, said source including the combination of a component having a positive temperature coefficient of resistance connected in series with a D.C. power source, said combination being bridged by a unidirectionally conductive device, and means coupled to receive said output pulses from said wave shaping means for indicating the rate of occurrence of said trigger pulses.

2. In combination, a source of input trigger pulses, means responsive to said trigger pulses for producing a signal waveform during at least a portion of half the time interval immediately following alternate trigger pulses, said signal waveform including an edge having a high rate of change characteristic, wave shaping means responsive to said signal waveform for producing a series of output pulses in time relationship with said edges of said signal waveform, means coupling said first mentioned means to a source of regulated electric power, said source including the combination of an incandesent lamp connected in series with a battery, said combination being bridged by a diode, and means coupled to receive said output pulses from said wave sharping means for indicating the rate of occurrence of said trigger pulses.

3. Electronic apparatus for indicating directly the speed of a rotating shaft comprising, a source of input trigger pulses having a rate of occurrence which is a function of the speed of rotation of said shaft, a bistable multivibrator having first and second switching elements, means for applying said input trigger pulses to both said first and said second switching elements for producing a signal waveform which is a function of said input trigger pulses, a wave shaping circuit coupled to receive said signal waveform from said multivibrator for producing a series of output pulses which is a function of said signal waveform, said wave shaping circuit including a resistance and a capacitor in series and a diode directly connected across said resistance, an amplifier for receiving and amplifying the output pulses from said wave shaping circuit, a source of supply connected to said amplifier, means coupled to said source of supply for regulating the voltage applied to said amplifier, and indicating means coupled to receive said amplified pulses for indicating the speed of said shaft at any given instant of time.

4. Electronic apparatus for indicating directly the speed of a rotating shaft comprising, a source of input trigger pulses having a rate of occurrence which is a function of the speed of rotation of said shaft, a bistable multivibrator having first and second switching elements, means for applying said input trigger pulses to both said first and said second switching elements for producing a signal waveform which is a function of said input trigger pulses, a wave shaping circuit coupled to receive said signal waveform from said multivibrator for producing a series of output pulses which is a function of said signal waveform, said wave shaping circuit including a resistance and a capacitor in series and a diode directly connected across said resistance, an amplifier for receiving and amplifying the output pulses from said wave shaping circuit, a source of supply connected to said amplifier, means coupled to said source of supply for regulating the voltage applied to said amplifier, indicating means coupled to receive said amplified pulses for indicating the speed of said shaft at any given instant of time, and calibration means associated with said indicating means for setting an index thereon to indicate the speed of said rotating shaft.

5. Apparatus as set forth in claim 4 wherein the indicating means comprises a current sensitive meter and the calibration means comprises a variable resistance bridging the terminals of said current sensitive meter.

6. An electronic tachometer for indicating the speed of an internal combustion engine having a rotating member comprising, a source of ignition pulses, a bistable multivibrator having first and second switching elements, means for applying said ignition pulses to both said first and said second switching elements for producing a rectangular wave pattern, the leading and trailing edges of said rectangular waves being produced in time coincidence with successively occurring ignition pulses, a differentiating network for producing alternately positive and negative pulses in time coincidence with the leading and end trailing edges respectively of said rectangular waves, clamping means bridging a portion of said differentiating network for eliminating all of said pulses of one polarity, an amplifier coupled to said differentiating circuit for amplifying the pulses of the other polarity, a source of supply connected to said amplifier, means coupled to said source of supply for regulating the voltage applied to said amplifier, and calibrated indicating means coupled to said amplifier for indicating the angular velocity of said rotating member in accordance with the frequency of said ignition pulses.

(References on following page)

References Cited in the file of this patent

UNITED STATES PATENTS

| | | |
|---|---|---|
| 2,137,859 | Schwartz et al. | Nov. 22, 1938 |
| 2,260,933 | Cooper | Oct. 28, 1941 |
| 2,352,082 | De Rosa | June 20, 1944 |
| 2,475,050 | Purington | July 5, 1949 |
| 2,715,712 | Pulsford | Aug. 16, 1955 |
| 2,743,417 | Hollmann | Apr. 24, 1956 |
| 2,751,553 | McEntee | June 19, 1956 |
| 2,767,582 | Bartelink | Oct. 23, 1956 |
| 2,773,238 | Petroff | Dec. 4, 1956 |
| 2,927,268 | Haggar et al. | Mar. 1, 1960 |
| 2,934,703 | Cohen | Apr. 26, 1960 |
| 2,957,136 | Franz | Oct. 18, 1960 |
| 2,962,657 | Horsch | Nov. 29, 1960 |
| 2,995,706 | Clarridge | Aug. 8, 1961 |

FOREIGN PATENTS

| | | |
|---|---|---|
| 1,004,078 | France | Nov. 21, 1951 |

OTHER REFERENCES

"Square Wave Analysis for Audio Amplifiers," article in Radio-Electronics, August 1950, pp. 10 and 11.